United States Patent
Frank

(10) Patent No.: US 9,032,192 B2
(45) Date of Patent: May 12, 2015

(54) METHOD AND SYSTEM FOR POLICY BASED AUTHENTICATION

(75) Inventor: Edward H. Frank, Atherton, CA (US)

(73) Assignee: Broadcom Corporation, Irvine, CA (US)

(*) Notice: Subject to any disclaimer, the term of this patent is extended or adjusted under 35 U.S.C. 154(b) by 2374 days.

(21) Appl. No.: 11/234,031

(22) Filed: Sep. 22, 2005

(65) Prior Publication Data

US 2006/0095953 A1 May 4, 2006

Related U.S. Application Data

(60) Provisional application No. 60/623,014, filed on Oct. 28, 2004.

(51) Int. Cl.
*G06F 21/54* (2013.01)
*H04L 9/32* (2006.01)
*H04L 9/08* (2006.01)

(52) U.S. Cl.
CPC ............ *H04L 9/3247* (2013.01); *H04L 9/3231* (2013.01); *H04L 2209/56* (2013.01); *H04L 2209/80* (2013.01); *H04L 9/088* (2013.01)

(58) Field of Classification Search
None
See application file for complete search history.

(56) References Cited

U.S. PATENT DOCUMENTS

| | | | |
|---|---|---|---|
| 6,170,057 B1 * | 1/2001 | Inoue et al. | 713/153 |
| 7,162,428 B1 * | 1/2007 | Rosenthal et al. | 705/1 |
| 7,401,233 B2 * | 7/2008 | Duri et al. | 713/193 |
| 7,434,256 B2 * | 10/2008 | Bahr | 726/16 |
| 7,469,139 B2 * | 12/2008 | van de Groenendaal | 455/411 |
| 7,707,621 B2 * | 4/2010 | Walmsley | 726/2 |
| 2003/0005316 A1 * | 1/2003 | Girard | 713/193 |
| 2003/0217137 A1 * | 11/2003 | Roese et al. | 709/223 |
| 2004/0123153 A1 * | 6/2004 | Wright et al. | 713/201 |
| 2004/0139349 A1 * | 7/2004 | Henn et al. | 713/201 |
| 2004/0198319 A1 * | 10/2004 | Whelan et al. | 455/411 |
| 2005/0055578 A1 * | 3/2005 | Wright et al. | 713/201 |
| 2005/0154885 A1 * | 7/2005 | Viscomi et al. | 713/165 |
| 2005/0198525 A1 * | 9/2005 | Trossen et al. | 713/200 |
| 2005/0278775 A1 * | 12/2005 | Ross | 726/2 |
| 2006/0020816 A1 * | 1/2006 | Campbell | 713/182 |
| 2006/0069756 A1 * | 3/2006 | Singh et al. | 709/220 |
| 2008/0288700 A1 * | 11/2008 | Holtzman et al. | 710/301 |
| 2009/0187968 A1 * | 7/2009 | Roese et al. | 726/1 |

* cited by examiner

*Primary Examiner* — Michael R Vaughan
(74) *Attorney, Agent, or Firm* — Sterne, Kessler, Goldstein & Fox PLLC

(57) ABSTRACT

A mobile device capable of performing a plurality of functions. The mobile device includes a memory for storing a plurality of different security policies; an input device for invoking a function from the plurality of functions by a user; a processor for assigning a first security policy from the stored plurality of security policies to the invoked function; and a security module for requiring the user to satisfy the assigned first security policy, before the invoked function is performed by the mobile device.

36 Claims, 8 Drawing Sheets

METHOD AND SYSTEM FOR POLICY BASED AUTHENTICATION

CROSS-REFERENCE TO RELATED APPLICATIONS

This patent application claims the benefit of the filing date of U.S. Provisional Patent Application Ser. No. 60/623,014, filed Oct. 28, 2004 and entitled "METHOD AND SYSTEM FOR POLICY BASED AUTHENTICATION"; the entire contents of which are hereby expressly incorporated by reference.

FIELD OF THE INVENTION

The present invention generally relates to data security systems and, more specifically, to a method and system for policy based authentication.

BACKGROUND OF THE INVENTION

The proliferation of distributed computing networks and, in particular, wireless communication networks has brought with it a greater need to secure the information that is transmitted through the networks. For example, the computing power and storage capacity now available in end-user mobile devices such as mobile phones and wireless Personal Data Assistants (PDAs) makes them a convenient mechanism for storing and using sensitive information (e.g., personal and business contact and financial information). Moreover, with higher integration of electronic circuits on smaller integrated circuits (ICs), mobile devices are increasingly capable of performing more functions, that is, multi-purpose and hybrid mobile devices are becoming available.

These mobile devices are increasingly being used to store, process, and communicate sensitive data. Therefore, the data stored and communicated by these devices need to be secured. A variety of cryptographic techniques are known for securing transactions in data networks. For example, the Secure Socket layer (SSL) protocol and its successor Transport Layer Security (TLS) provides a mechanism for securely sending data between a server and a client. Briefly, the SSL provides a protocol for authenticating the identity of the server and the client and for generating an asymmetric (private-public) key pair. The authentication process provides the client and the server with some level of assurance that they are communicating with the entity with which they intended to communicate. The key generation process securely provides the client and the server with unique cryptographic keys that enable each of them, but not others, to encrypt or decrypt data they send to each other via the network.

TLS is also a cryptographic protocol that is used to secure web (HTTP) connections. It has an entity authentication mechanism; a key setup phase, where a symmetric encryption key is formed by employing public-key cryptography; and an application-level data transport function. Like SSL, the TLS protocol operates in modular fashion, with support for forwards and backwards compatibility and negotiation between peers. Both TLS and SSL involve a number of basic phases: Peer negotiation for algorithm support, Public-key encryption-based key exchange and certificate-based authentication, and Symmetric cipher-based traffic encryption.

FIG. 1 shows, in simplified form, several layers in a security system 102. Entities in the system may securely transfer data between one another by encrypting the data 104 before it is transmitted. Before another entity is able to decrypt received data, however, it must obtain an appropriate key. Hence, data encryption depends on a secure method of key negotiation 106 between the entities. If the key negotiation is not secure (e.g., the keys are intercepted by unauthorized persons), the encrypted data may be compromised. Likewise, a prerequisite to secure key negotiation is the ability to authenticate the parties 108 involved in the exchange. In other words, each entity must be sure that it is not negotiating with an entity that is, for example, masquerading as the intended entity. The authentication process ultimately relies on a root key 110 that uniquely and reliably identifies a specific entity. Hence, this root key is often referred to as the cryptographic identity of the entity.

In practice, a system may include many levels of cryptographic protection. For example, a typical e-commerce server may need to negotiate keys with thousands of clients per day. Moreover, these clients typically reside in relatively insecure environments (e.g., a personal computer). If the system is to remain secure, the root key should not be used for these transactions given that there is a relatively high possibility that the key may be compromised. Accordingly, in practice the root key is used to generate other keys that may then be used to generate even lower level keys.

Typically, these lower level keys will be used for relatively short periods of time. For example, lower level keys such as SSL session keys may be valid only for a single session. Thus, the potential for damage may be much less in the event a session key is compromised as opposed to a higher level key. For example, the entire system will not be compromised and the key will expire relatively quickly.

In contrast, once a higher level key is compromised, all subsequent (e.g., lower) levels may be compromised. Moreover, higher level keys tend to be used for relatively long periods of time. Thus, the potential for harm is much greater. Accordingly, protection of higher level keys is a primary goal in any cryptographic security system.

As mentioned above, in a typical e-commerce transaction a unique set of SSL keys are generated for each session. For example, when a user uses a web browser to securely access a financial website for a bank, a set of session keys may be generated for the session. These session keys are used to encrypt and decrypt data sent between the server (e.g., the bank's server) and the client (e.g., the browser). To prevent these keys from being intercepted by unauthorized persons, a higher level key (e.g., a private-public key pair negotiated between the bank's server and the client) will be used to encrypt and decrypt the session level keys. As discussed above, however, protection of this higher level key is of utmost importance.

Referring to FIG. 2, in a typical personal computer (PC)-based application, a client device stores its private key (Ka-priv) 214 in a system memory 206 of the computer 200. When a session is initiated, the server encrypts the session key (Ks) 228 using the client's public key (Ka-pub) then sends the encrypted session key (Ks) Ka-pub 222 to the client. As represented by lines 216 and 224, the client then retrieves its private key (Ka-priv) and the encrypted session key 222 from system memory via the PCI bus 208 and loads them into a public key accelerator 210 in an accelerator module or card 202. As represented by line 226, the public key accelerator uses this downloaded private key 220 to decrypt the session key and loads the clear text session key (Ks) 228 into system memory.

When the server needs to send sensitive data to the client during the session the server encrypts the data using the session key (Ks) and loads the encrypted data (data) Ks 204 into system memory. When a client application needs to access the plaintext (unencrypted) data, it may load the session key 228 and the encrypted data 204 into a symmetric algorithm engine (e.g., 3DES, AES, etc.) 212 as represented by lines 230 and 234, respectively. The symmetric algorithm engine uses the loaded session key 232 to decrypt the encrypted data and, as represented by line 236, loads plaintext data 238 into system memory. At this point the client application may use the data.

The SSL protocol and other protocols provide a relatively high level of security for data transfers when both the client and the server are secure. However, given the increased sophistication of hackers and authors of computer viruses, there is a possibility that the security of these devices may be comprised. For example, a virus running on a computer may be able to access data stored in the data memory of the computer. Moreover, the virus may be able to send this information to a third party.

Referring again to the example of FIG. 2, the client's private key (Ka-priv) may be stored in the clear (e.g., unencrypted) in system memory and it may be transmitted in the clear across the PCI bus. Moreover, operating system calls may be used to provide the data transfers to and from the cryptographic accelerator. All of these aspects of the system are susceptible to attack by hackers, viruses or other means. Given that in an SSL transaction the client's private key is essentially a certificate that identifies the server (hence it may essentially comprise the server's private key), conventional architectures such as this may not provide sufficient security for many applications.

Components such as a hardware security module ("HSM"), typically constructed as multi-chip boards, may be used to provide a higher level of security for highly security-sensitive applications. Conventionally, a hardware security module provides secure key management to generate cryptographic keys, sets the capabilities and security limits of keys, implements key backup and recovery, prepares keys for storage and performs key revocation and destruction.

However, different policies, such as the data being accessed or communicated, the application (function) being invoked, and/or the location of the device being used, may require different level of security. For example, a mobile phone/PDA may require no security for placing calls, because the user does not worry as much about unauthorized phone calls from the phone, since phone calls are relatively inexpensive. While, the user may require a medium security for accessing a stored address book, and a high security for accessing stored (confidential) financial and/or medical data stored in the PDA.

Due to these constraints, it is impractical to implement an across-the-board security policy in a mobile devices. Accordingly, there is need for improved security in mobile devices based on different policies.

SUMMARY OF THE INVENTION

The invention relates to a method and system for authentication of users and/or access to data and/or function of a computing device, preferably, a mobile device.

In one aspect of the invention, a policy-based secure mobile device is capable of performing a plurality of functions and includes a memory for storing a plurality of different security policies; an input device for invoking a function from the plurality of functions by a user; a processor for assigning a first security policy from the stored plurality of security policies to the invoked function; and a security module for requiring the user to satisfy the assigned first security policy, before the invoked function is performed by the mobile device.

In one embodiment, the invention is a method for data security of a mobile device, which is capable of performing a plurality of functions. The method includes: storing a plurality of different security policies; invoking a function from the plurality of functions by a user; assigning a first security policy from the stored plurality of security policies to the invoked function; and requiring the user to satisfy the assigned first security policy, before the invoked function is performed by the mobile device.

In one embodiment, the invention is a mobile device capable of performing a plurality of functions. The mobile device includes a memory for storing a three-dimensional matrix of security policies, wherein the three-dimensional matrix includes a plurality of security requirements as a first dimension, the plurality of function as a second dimension, and a plurality of locations for the mobile device as a third dimension; an input device for invoking a function from the plurality of functions by a user; a processor for assigning a security requirement from the stored three-dimensional matrix to the invoked function, depending on the invoked function and the location of the mobile device; and a security module for requiring the user to satisfy the assigned security requirement, before the invoked function is performed by the mobile device.

BRIEF DESCRIPTION OF THE DRAWINGS

These and other features, aspects and advantages of the present invention will be more fully understood when considered with respect to the accompanying drawings, wherein.

DETAILED DESCRIPTION

The invention relates to a method and system for policy based authentication. In one embodiment, the method and system of the present invention assigns and enforces different security requirements (e.g., data integrity, data confidentiality, and/or non repudiation) to the data being processed/accessed, the function being invoked, the user and/or the location of the device. In one embodiment, the availability of functions of a mobile device changes, depending on authentication of the user and/or location of the device.

Figure 1:
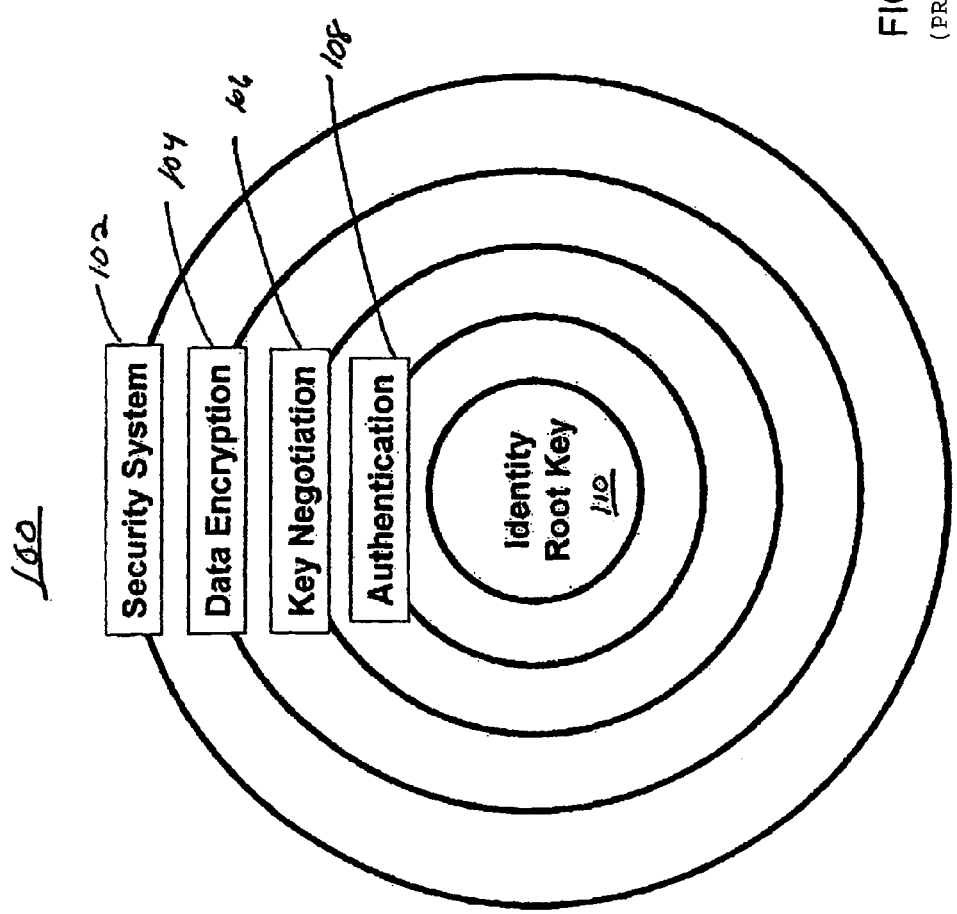
FIG. 1 is a simplified diagram of exemplary layers in a security system.
Figure 2:
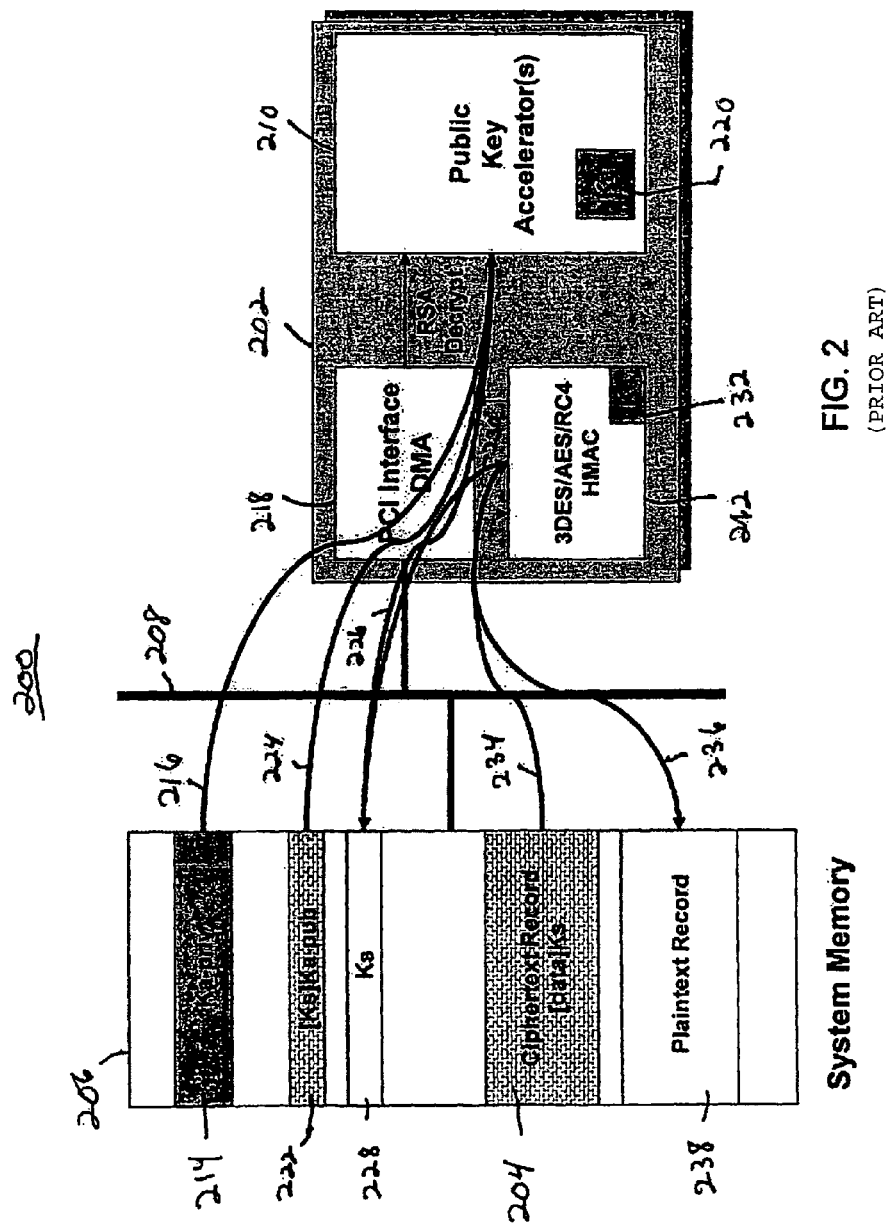
FIG. 2 is a simplified diagram of security processing in a computing system.
Figure 3:
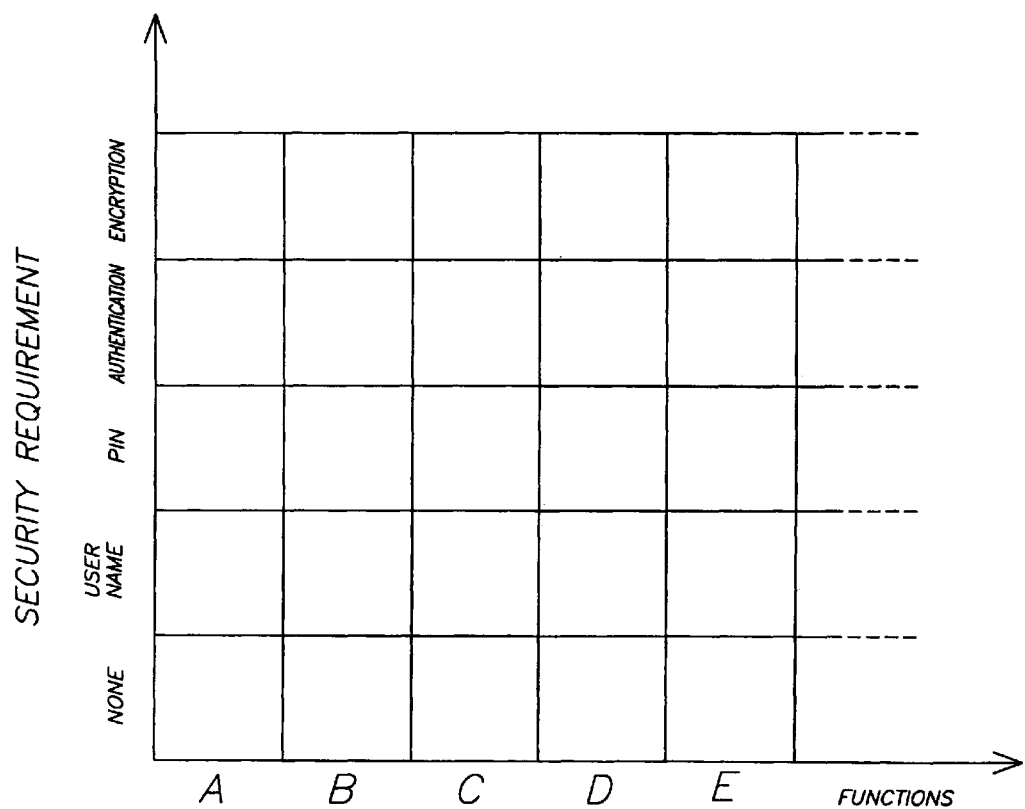
FIG. 3 shows a two-dimensional security policy matrix for a digital device, according to one embodiment of the present invention.

FIG. 3 shows a two-dimensional security policy matrix for a digital device, such as a mobile device, in which the rows indicate different security requirements and the columns depict different functions. Security requirements vary from no-security to very secure. As shown, function A does not need any authentication, but function B needs at least a user name. Function C requires a PIN number in addition to, or in lieu of the user name. Function D requires some basic encryption, while function E demands a full authentication of the user including a digital signature.

As an example, function A may be placing a call on a mobile phone which would not need any security, because the cost of having unauthorized phone calls are increasingly cheap. Function B may represent accessing emails and personal contacts which would require a user name, while function C may characterize accessing personal financial or medical data and thus requiring a PIN. Likewise, function D may stand for accessing highly confidential financial data of a company that is stored by a company executive on his/her PDA device. This data may require encryption and the user needs to be authenticated, before he/she can access that data.

Figure 4:
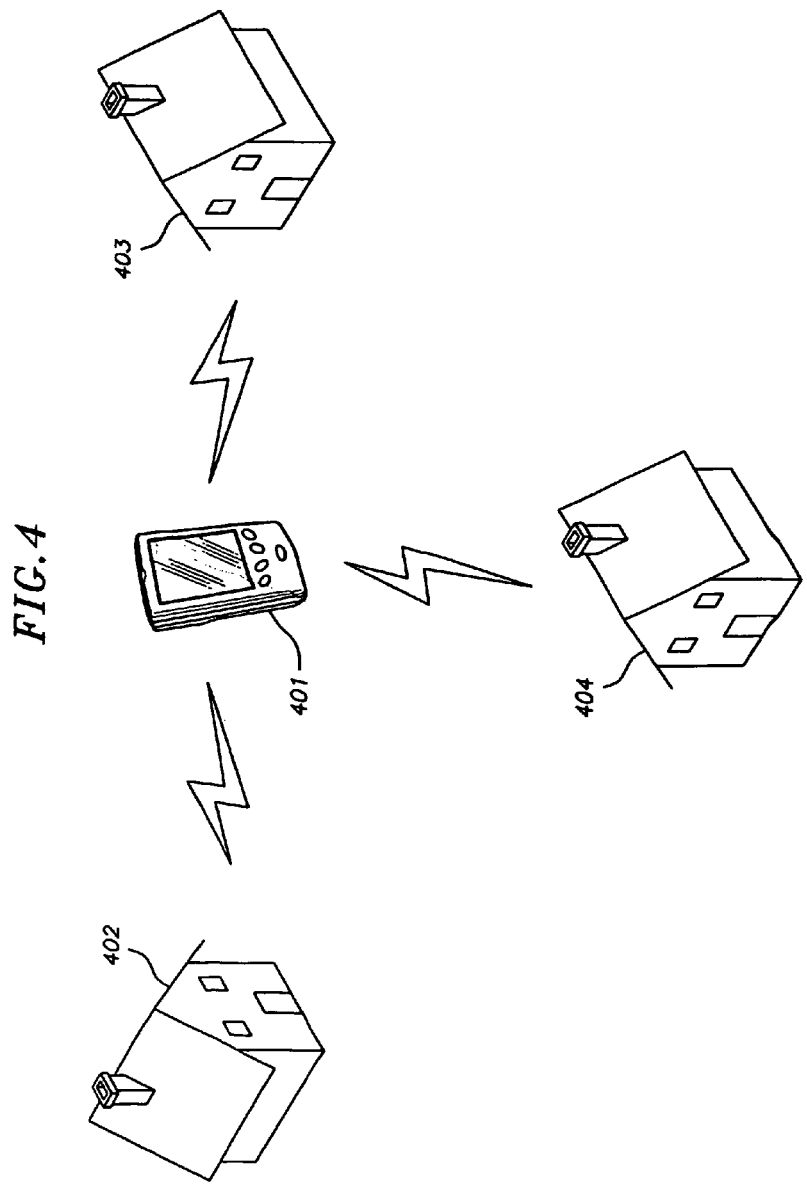
FIG. 4 illustrates the location-based data security policy, according to one embodiment of the present invention.

Yet, another dimension of security policy is the location of the device (or the user). In one embodiment, different security requirements are assigned to the device, to the functions performed, and/or to the data accessed by the device, based on the location of the device (or the user). FIG. 4 illustrates the location-based data security policy, according to one embodiment of the present invention. Locations (buildings in this example) 402, 403, and 404, each may require a different security requirement for accessing data and/or functions by the mobile device 401.

For example, when inside (or within a proximity of) the office building 402, only certain data and/or functions, such as, data related to projects and administrative data may be made available to device 401. Likewise, when in the manufacturing building 403, certain data and/or functions, such as manufacturing related data/functions may be made available to device 401. Similarly, when in the headquarter building 404, all data and/or functions, including manufacturing and financial related data/functions may be made available to device 401. However, while in the headquarter building 404, wireless transmission function of the device 401 may be disabled unless, overridden by an authorized and authenticated Officer of the company.

There are well-known location determining system available to determine the location of the mobile device. For example Global Positioning System (GPS) may be used to establish the location of the device. Alternatively, or in addition to the GPS, transponders may be used in a building (or rooms within a building) to determined the location of the mobile device. In one embodiment RF ID devices may be carried by the user to not only identify the user, but also to establish the location of the user.

Figure 5:
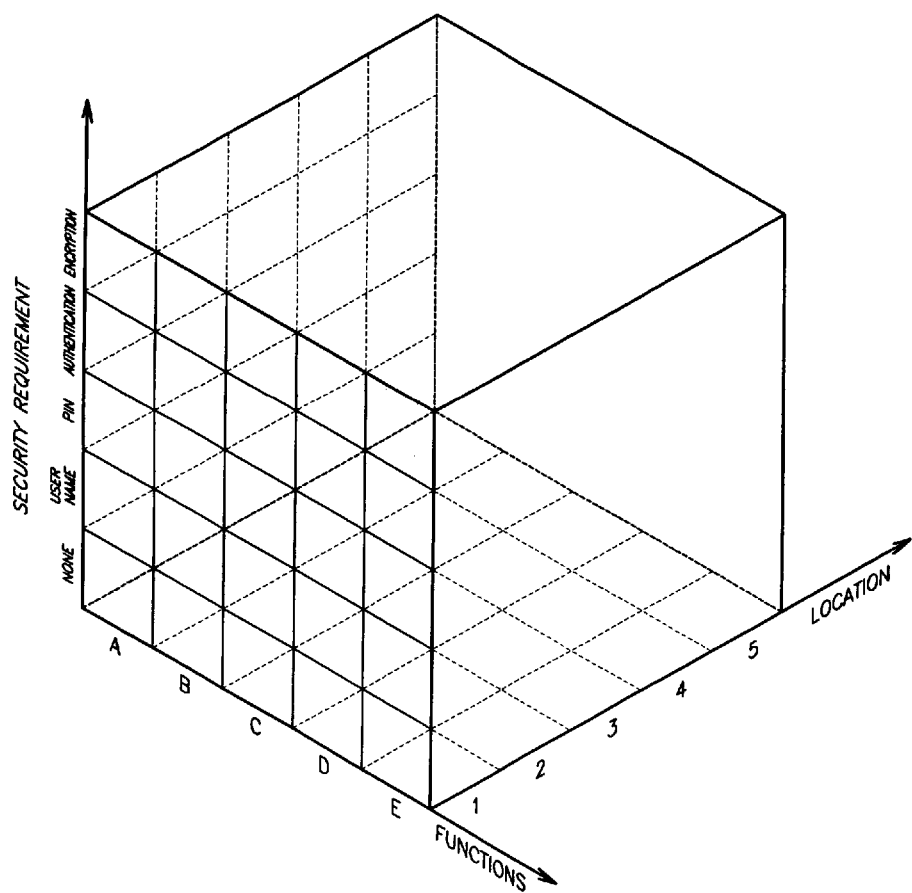
FIG. 5 depicts a three-dimensional security policy matrix for a digital device, such as a mobile device, according to one embodiment of the present invention.

FIG. 5 depicts a three-dimensional security policy matrix for a digital device, such as a mobile device, according to one embodiment of the present invention. Similar to the two-dimensional security policy matrix of FIG. 3, a first dimension indicates different security requirements, a second dimension depicts different functions, and a third dimension shows location of the device (or the user). Again, security requirements vary from no-security to very secure. Location may be an office building, a manufacturing building, a headquarter, or none-of-the-above location.

As shown, function A does not need any authentication, when the device is located in the headquarter building, but may need at least a user name when the device is located in the office building. Similarly, when the device is located in the manufacturing building and the function is accessing confidential financial data of the company, the user needs to be authenticated and the encrypted data needs to be decrypted by the device. Again, various cryptographic protocols may be required depending on the location of the device and/or the function being invoked.

Generally, a cryptographic protocol is an abstract or concrete protocol that performs a security-related function and applies cryptographic methods. The most widely used cryptographic protocols are protocols for secure application-level data transport. A cryptographic protocol of this kind usually incorporates at least some of the following aspects:
  Entity authentication,
  Symmetric encryption and message authentication http://en.wikipedia.org/wiki/Key_%28cryptography%29material construction,
  Secured application-level data transport, and
  Non-repudiation methods.

Some desirable properties of a cryptographic protocol include:
  Confidentiality, also known as secrecy. This means only an authorized recipient should be able to extract the contents of the message from its encrypted form. Otherwise, it should not be possible to obtain any significant information about the message contents.
  Integrity that is the recipient should be able to determine if the message has been altered during transmission.
  Authentication meaning the recipient should be able to identify the sender, and verify that the purported sender actually did send the message.
  Non-repudiation requires the sender not be able to deny sending the message. For example, non-repudiation of origin proves that data has been sent, and non-repudiation of delivery proves that the data has been received.

Cryptography can provide mechanisms to help achieve all of the above. However, some goals aren't always necessary, practical or even desirable in some contexts and applications. For example, the sender of a message may wish to remain anonymous; clearly non-repudiation would be inappropriate in that case. The method and system of the present invention provides a capability to select and enforce the desirable properties of a cryptographic protocol, depending on type of data, the function being invoked, the identity of the user and/or the location of the device (or the user), among others. In one embodiment different security requirements are assigned and enforce to the data being processed/accessed, the function being invoked, the user and/or the location of the device.

For example, if the data being accessed and/or the function being invoked is of a high importance, in addition to confidentiality of data, a data integrity check is performed for the relevant data. The data integrity check may include a check to verify whether the data is unchanged from its source and has not been accidentally or maliciously modified, altered, or destroyed; and/or a check to verify whether the data is identically maintained during any operation, such as transfer, storage, and retrieval.

As another example, depending on the identity of the user and/or location of the device, verification is performed to confirm that the computer, computer program, or a sender from whom the user of the mobile device has received some communication is, or is not, the claimed party (for instance, using digital signatures). Alternatively, a blind credential, which does not establish identity at all, but only a narrow right or status of the sender or the sending program may be assigned to data transaction.

Figure 6:
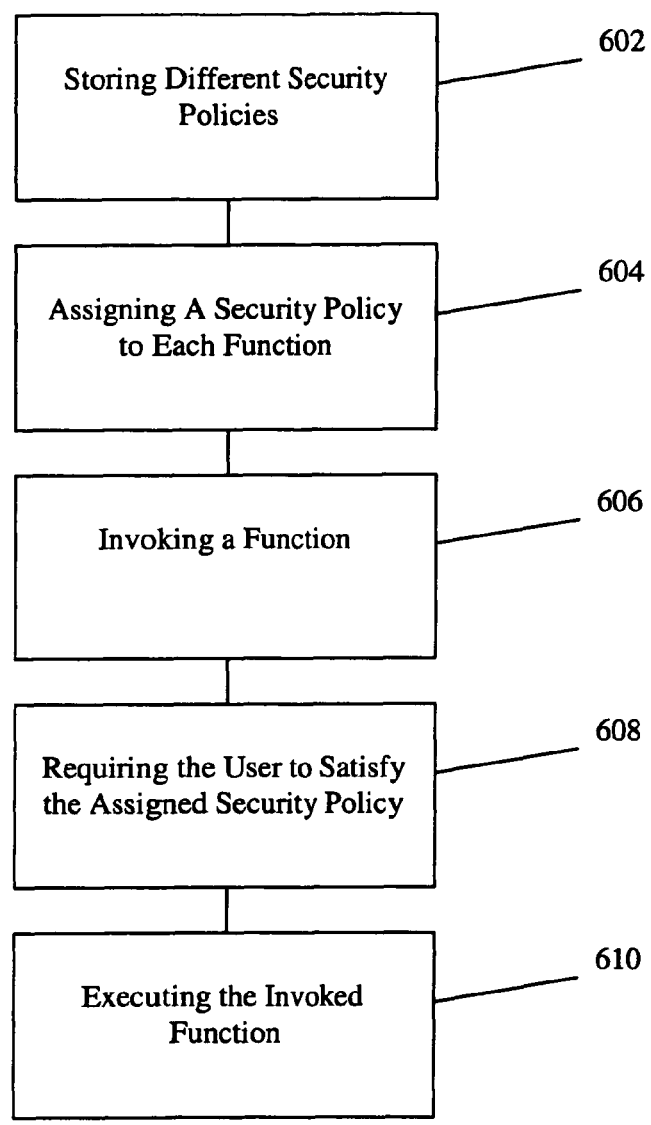
FIG. 6 is an exemplary process flow for a policy based authentication, according to one embodiment of the present invention.

FIG. 6 is an exemplary process flow for a policy based authentication, according to one embodiment of the present invention. As shown in block 602, a plurality of different security policies are stored in the mobile device. For example, the security policies include no security requirement, user-name required, PIN required, encryption required, authentication required, and the like. In one embodiment, the security policies may be structured as a three-dimensional matrix similar to the matrix of FIG. 5 including security requirements, type of functions and the location of the device.

In block 604, each of the available functions of the mobile device is associated with a security policy. In other words, a security policy is assigned to the available functions of the device. When a function is invoked by the user (block 606), the user is required to satisfy the security policy assigned to the invoked function. For example, if the invoked function requires a PIN, the user has to input the required PIN. The PIN may be an alphanumeric character or a biometric PIN, such as, a finger print, retina image, and the like. If the user satisfies the security requirement associated with the invoked function, the function is then performed by the device, as shown in block 610. For example, a requested data is accessed and displayed, a (wireless) communication with a second device (program, or database) is established, or a call is made.

In one embodiment, depending on the location of the device or identity of the user, a different set of functions are made available to the user. The method blocks in FIG. 6 do not have to be performed in the illustrated order and can be performed in a variety of different orders. For example, the security policies may be assigned to all of the available functions before any function is performed. This can be implemented by "tagging" each function with a flag representing a specific security policy. Alternatively, as a function is performed, a processor within the mobile device checks a table in the memory and assigns a security requirement to the invoked function, before the function is performed.

Figure 7:
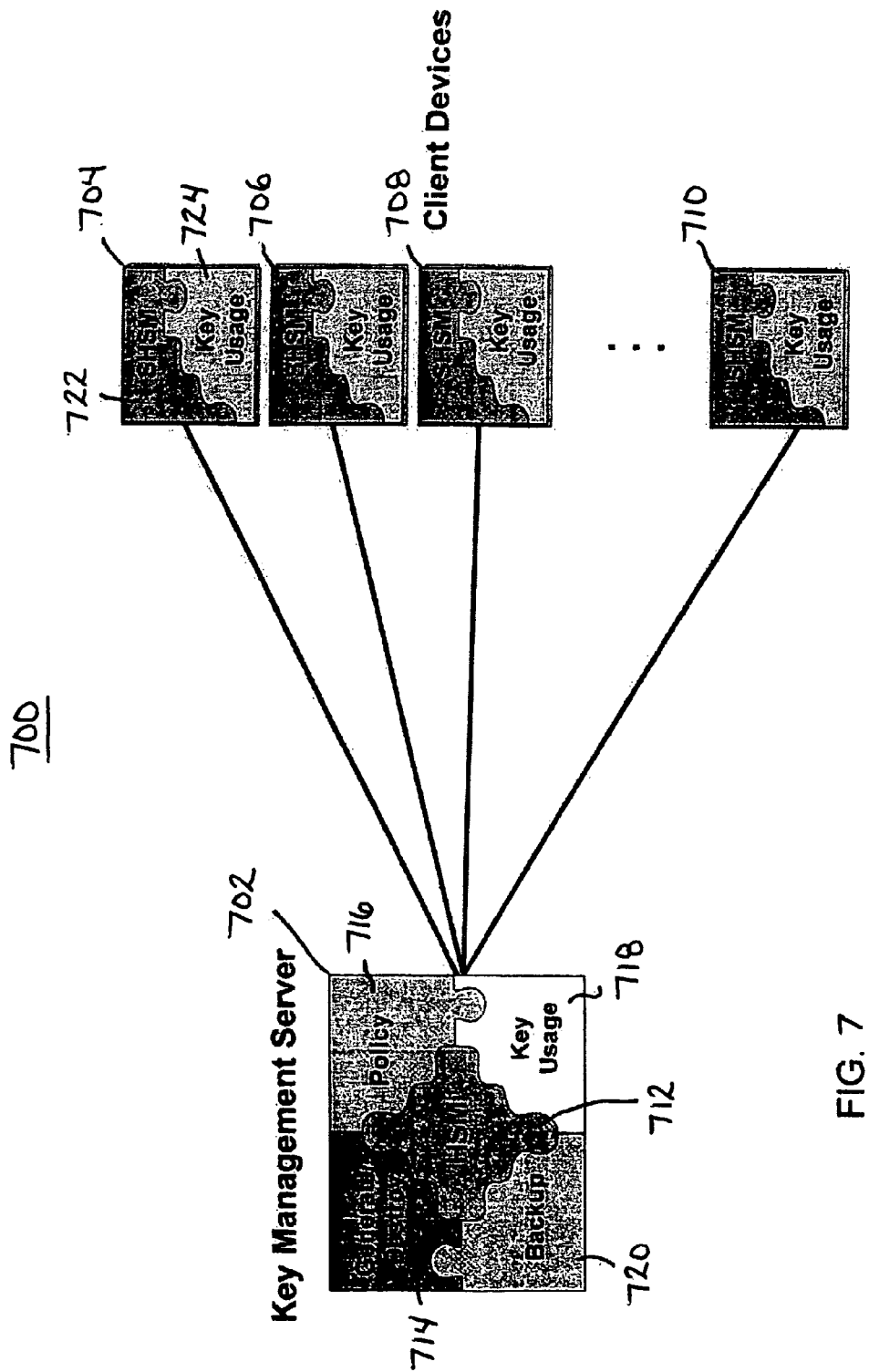
FIG. 7 illustrates an exemplary key management system, according to one embodiment of the present invention.

FIG. 7 illustrates an exemplary key management system 700 that incorporates stateless key management modules (hereafter referred to as stateless modules for convenience) for managing the security requirements of the mobile devices (clients), according to one embodiment of the present invention. All the communications of the mobile device with other devices are within a secure boundary to meet a high security demand, if required by the security policy of the mobile device.

As shown, a key management server (e.g., an HSM) 702 is configured to manage multiple remote stateless modules in mobile (client) devices 704, 706, 708 and 710. For example, client device 704 includes a stateless hardware security Module ("SHSM") 722.

The stateless modules within the mobile devices provide key enforcement and/or usage functions that are, in effect, separated out from the main key management functions provided by the HSM. For example, for a high security requirement, the HSM may provide all of the services for secure key management such as generating and destroying keys 714, establishing and enforcing a new key policy 716, using keys 718, providing key backup and secure key storage 720 and communicating with peers. The keys may be used for different levels of cryptography (e.g., different levels of authentication, authorization, and/or data integrity checks) depending on type of data, the function being invoked in the mobile device, the identity of the user and/or the location of the device.

Inherently, these operations require that the HSM keep track of its current state. For example, for a given security requirement, the HSM keeps track of all keys it generated and it maintains state information associated with each of these keys. This information may be used, for instance, to determine the entity to which each key was issued and when to destroy or revoke keys. The stateless module provides components for securely receiving keys (e.g., SHSM 722) and using keys (e.g., key usage component 724 in client device 704), depending on the current security requirement.

Key usage operations may include one or more of encryption, decryption, authentication, signing and verification, depending on how, where, and/or by whom the mobile device is being used. As an example, after the HSM securely sends keys to the stateless module these keys may be used to decrypt data and/or keys for the mobile client device. In addition, the stateless module may send secured (e.g., encrypted and/or authenticated) data to a designated device via the secure connection, depending on the required security of the mobile device.

The stateless module provides a secure usage environment that may be remotely separated from, yet cryptographically secured to, the HSM. First, any keys and data within the stateless module are protected by hardware (e.g., the physical constraints provided by the integrated circuit, i.e., the chip). Second, the stateless module may be configured to prevent the keys and data from being exported from the chip in the clear. Third, a key transfer protocol may be established between an HSM and stateless module in a remote system to, for example, allow keys generated in the HSM to be securely transferred to the remote system.

Figure 8:
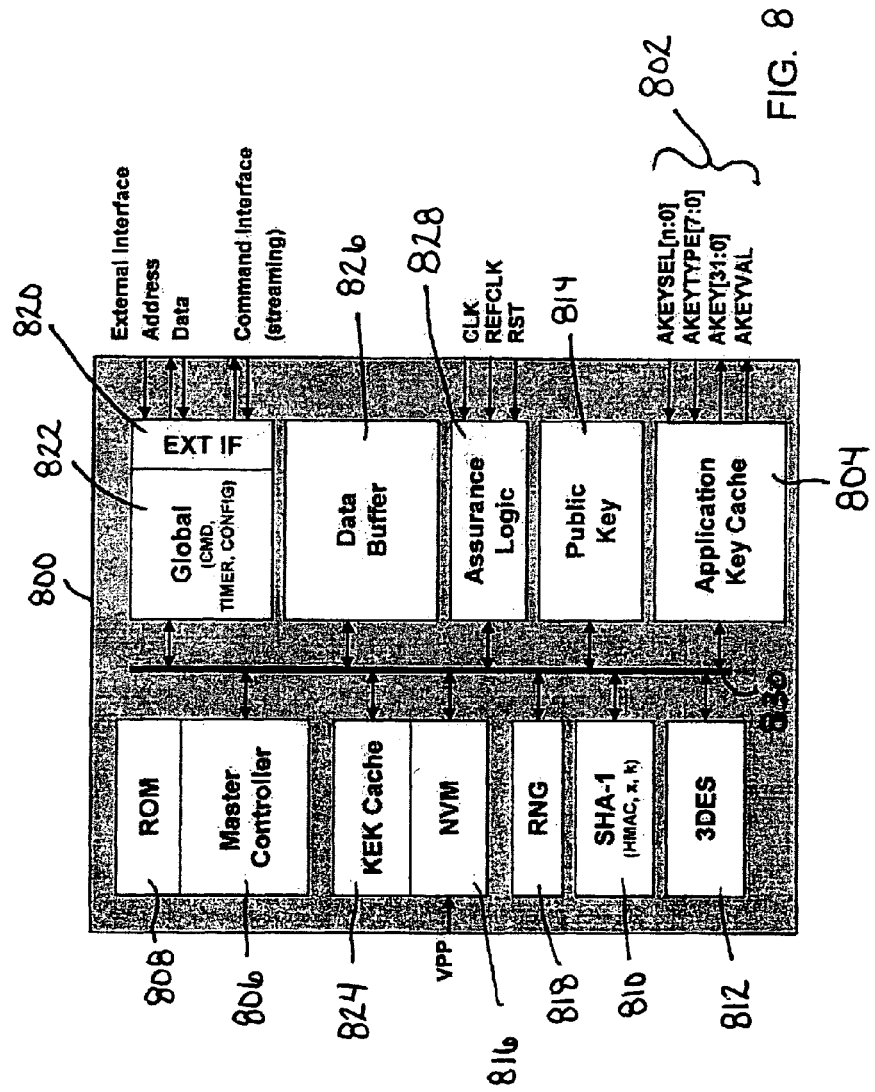
FIG. 8 is a simplified exemplary block diagram of a stateless hardware security module, according to one embodiment of the present invention.

FIG. 8 is a simplified exemplary block diagram of a stateless hardware security module, according to one embodiment of the present invention. The stateless hardware security module 800 is included with the mobile device for managing the policy based authentication and related keys of the mobile device. In one embodiment, in addition to the hardware security module 800, the mobile device includes and processor and memory for communication with the security module and for executing different functions. The stateless module (e.g., SHSM) may provide key protection and management (e.g., enforcing proper usage of keys) required for multiple levels of key material.

Typically, the root key is an asymmetric key pair (secret or private, public) that is used to uniquely identify the stateless module (mobile device). In some embodiments this key is only used for digital signatures to securely identify the stateless module. The stateless module (e.g., SHSM) may provide key protection and management (e.g., enforcing proper usage of keys) required for multiple levels of key material.

The stateless module also may include a privacy (or confidentiality) asymmetric key pair that may be used for transferring secure content to the stateless module device from an intermediate insecure third party such that the third party does not have access to the key material. In some embodiments the confidentiality key is only used to decrypt key material within the stateless module.

The above keys may be stored in the nonvolatile memory ("NVM") 816. The NVM may comprise, for example, a one-time programmable ("OTP") memory or battery backed memory (BBMEM). In some embodiments an on-chip OTP memory may be preferred because the contents of the OTP memory need not pass outside of the chip. In the case of an OTP, the OTP may be programmed by the master controller 806 via a programming interface in conjunction with an external programming signal. A pseudo-random number generator ("RNG") 818 may generate a random number using the internal random number value as a secret initialization seed. The number of bits in the initialization seed may be determined by the amount of key entropy required for the system.

In some embodiments the value from the random number generator 818 is never used directly. For example, it may be post processed using the SHA-1 block 810 by the master controller before internal usage and before exposing the number external to the stateless module as a random value. The master controller may maintain a cache of post processed random bits (for key generation and for signing) in the data buffer 826.

In some embodiments the master controller 806 comprises a RISC processor with ROM code to execute the various commands necessary for the operation of the stateless module. The master controller block also may include the address decoder for each of the slave blocks on the internal bus. The RISC engine uses a protected portion of the data buffer for temporary stack and scratch data space. The protected data region is not allowed to ever overlap with any space that may be allocated to the external memory interface.

The stateless module may be configured to be part of a security boundary. For example, the stateless module may be configured to never allow clear text keys to exit, for example, the security module or the chip within which the security module is implemented. As a result, the security module may be safely integrated into other devices or systems regardless of whether the system outside of the security boundary is secure.

The external data interface 820 may be used by a local host to read global registers, issue commands and place data into the data buffer 826 for processing by the stateless module. In some embodiments, the interface 820 is address mapped. The external interface may be controlled through a global register block 822 by the master controller. These global registers may include, for example, command ("CMD"), timer and configuration ("CONFIG.") resisters. The master controller transfers the data between the global registers block and the data buffer memory.

The public key value may be read from the stateless module via the external interface. For example, the public key read command may be issued to the stateless module in response to which the stateless module returns the public key value. Any non-secure configuration information for the device (authorization data, product configuration data, etc.) also may be returned with the public key data.

The command interface provides a streaming data interface directly into the data input and data output registers. It allows an external FIFO to be used for data input and data output (separate FIFOs). This interface allows the stateless module to be easily embedded into a packet based system.

The stateless module includes several cryptographic processing blocks. For example, processing blocks may be incorporated to perform an HMAC-SHA-1 message authentication code algorithm. Processing blocks also may be provided for performing confidentiality symmetric algorithms such as 3DES and AES. Public key algorithms that may be supported include, for example, Diffie-Hellman, Digital Signature Algorithm ("DSA") and RSA. Discrete Logarithm Integrated Encryption Standard ("DLIES") algorithms also may be supported. Depending on the performance requirements of the system, these processing blocks may be implemented in hardware and/or using software executing on one or more processors. Different cryptographic processing blocks may be used based on the required security of the mobile device.

The embodiment of FIG. 8 includes a public key acceleration engine ("PKE") 814. The PKE 814 may provide acceleration for algorithms such as the Diffie-Hellman algorithm, the RSA algorithm and/or the digital signature standard ("DSA") algorithm. The Diffie-Hellman public key algorithm may be used, for example, for key agreement in a number of protocols, including IKE, SSL, and TLS. The RSA public key algorithm may be used, for example, for digital signature authentication and key exchange in IKE, SSL, and TLS. The DSA algorithm may be used, for example, to sign and verify data.

The PKE may be used to encrypt, decrypt, sign and verify application data using keys from the application key cache 804. For example, the PKE may be accessed using the public key acceleration commands provided by the stateless module to the host for application key acceleration. In some embodiments the host cannot directly access any of the functions provided in the PKE. The stateless module may require that all "secret" key material for the PKE messages be loaded from the application key cache for user commands. The authentication core 810 may be used to provide the basic SHA-1 algorithm implementation. The encryption core 812 is a triple DES minimal gate count implementation.

The single round implementation implements both encryption and decryption of the CBC and ECB 3DES algorithm. The key is provided via a key register (write only) that is written by the master controller. The key values are transferred from the application key cache, KEK key caches or the result of the shared secret derivation prior to data operations. The 3DES block 812 protects the data operation such that the master controller cannot change the key during a block encryption or decryption.

The key-encryption-key ("KEK") cache 824 is a separate memory block sized based on the required number of KEKs in the system. Typically, it is large enough to hold the session private key and a single asymmetric group key. The KEK Cache 824 is protected in hardware during the execution of any command that does not require a KEK key.

Some KEK cache locations are contained in the NVM block that is used to implement the long term keys for the stateless module. The long term keys are formatted and accessed as any other key locations in the KEK cache from the external interface. All of the same access controls of the KEK cache are enforced on the NVM keys. The NVM key locations may use fixed values for 'g' and 'p' that are embedded in the master controller ROM.

In general, the performance, size and function of the blocks discussed above may be scaled to meet the demands of the system. For example, the basic cryptographic functions that implement the secure channel back to the HSM to transfer and process key material (and/or policy) may be provided at minimal processing performance levels.

The cryptographic accelerators contained within the stateless module can be used for application data processing when they are not being used for key management functions. For example, a stateless module for an e-commerce application may be used to protect RSA private keys.

The application key cache 804 stores key material that may be used by external cryptographic acceleration processors. For example the cache 804 may store decrypted application keys (e.g., the RSA private key for an application executing on the device that contains the stateless module).

More than one cryptographic accelerator may be connected to the stateless module. For example, separate cryptographic accelerators may be used to provide symmetric and asymmetric key algorithms.

The application key cache 804 also may be used by the master controller to provide encryption and decryption storage for the internal acceleration cores (such as the public key core 814 or the 3DES core 812). The application key cache may enforce key lifetime expiration when the keys are used by either the stateless module commands or the application key cache interface.

The application key cache 804 may store both asymmetric key and symmetric key material. As represented by the input and output signals 802 in FIG. 8, an accelerator may provide the key location and key type to the stateless module to access the keys in the key cache.

The stateless module enforces key policy for keys used within the remote client. The key policy may be set by the HSM for all keys that are delivered to the stateless module. The key policy indicates how the key can be used by the stateless module. In addition to usage policy, the stateless module can enforce a lifetime for keys. Typically, a key lifetime is a relative time from the time at which the key is loaded into the stateless module. The HSM can use the multiple levels of key hierarchy and the lifetime policy enforcement to ensure that keys are used properly and are revocable at the stateless module.

A security assurance logic block 828 protects the stateless module from system security attacks. To this end, several system monitors may be coupled with the other components in the stateless module and/or the chip (and/or the system) within which the stateless module resides.

The stateless module boots to a secure state with the external interface disabled. That is, the interface is locked out by hardware. Once reset processing and self-tests have completed, the master controller sequences through a series of commands to exit the secure state and enter a USER state. In some embodiments these commands require execution of a predefined set of sequential instructions be written to non-sequential addresses.

The hardware tracks the number of clocks it takes to execute each step of the sequence and ensures that these commands occur in the required order to the required address at exactly the right clock cycle. After the exit logic has completed, the mode is set via hardware to USER mode. In USER mode, the hardware locks out master controller access to all of the internal blocks except the data buffer and the data input/output registers (only blocks that are required to move data into the device).

Once the command has been moved into the data buffer, the master controller sequences a series of commands to return to the secure state. This sequence is again tracked and enforced via the hardware block to enter into secure mode. It also ensures via hardware that the master controller enters the secure mode with the proper entry address.

The master controller ROM 808 may be programmed using an extra bit to indicate which instructions are valid code entry and code exit points. The instruction code entry/exit points are enforced in hardware whenever the master controller takes a non-sequential code fetch. This mechanism helps to ensure that it will be difficult for an attacker to get the master controller to bypass certain portions of code. As a result, it may be virtually impossible to successfully attack the module by causing random jumps in the program execution.

In an alternative embodiment, the stateless module may be assigned long-term keys. In this case, the stateless module may not need to interface with a head-end server (e.g., key manager).

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A mobile device configured to perform a plurality of functions comprising:
    a memory for storing a plurality of different security policies, wherein each of the plurality of different security policies has a corresponding security requirement, wherein each of the plurality of functions has an associated security policy, wherein each security requirement requires either authentication or encryption of data associated with the function of the corresponding security policy;
    an input device for invoking a function from the plurality of functions by a user;
    a processor for implementing a first security policy from the stored plurality of different security policies associated with the invoked function; and
    a security module for requiring the user to satisfy a security requirement corresponding to the first security policy, before the invoked function is performed by the mobile device.

2. The mobile device of claim 1 further comprising means for determining a location of the mobile device and wherein the processor implements a second security policy from the stored plurality of different security policies associated with the invoked function, based on the location of the mobile device.

3. The mobile device of claim 2 wherein the processor changes some of the plurality of functions available to be performed by the mobile device, based on the location of the mobile device.

4. The mobile device of claim 1 wherein the invoked function is accessing data.

5. The mobile device of claim 4 wherein the data is locally stored in the mobile device.

6. The mobile device of claim 4 wherein the data is stored in a remote location from the mobile device.

7. The mobile device of claim 1 wherein the invoked function is making a phone call.

8. The mobile device of claim 1 wherein the security module requires the user to enter a user name to satisfy the security requirement corresponding to the first security policy.

9. The mobile device of claim 1 wherein the security module requires the user to enter a PIN to satisfy the security requirement corresponding to the first security policy.

10. The mobile device of claim 9 wherein the PIN is a biometric PIN.

11. The mobile device of claim 1 wherein the security module requires the user to be authenticated using a digital signature to satisfy the security requirement corresponding to the first security policy.

12. A method for data security of a mobile device configured to perform a plurality of functions, the method comprising:
    storing a plurality of different security policies, wherein each of the plurality of different security policies has a corresponding security requirement, wherein each of the plurality of functions has an associated security policy, wherein each security requirement requires either authentication or encryption of data associated with the function of the corresponding security policy;
    invoking a function from the plurality of functions by a user;
    implementing a first security policy from the stored plurality of different security policies associated with the invoked function; and
    requiring the user to satisfy a security requirement corresponding to the first security policy, before the invoked function is performed by the mobile device.

13. The method of claim 12 further comprising determining a location of the mobile device and implementing a second security policy from the stored plurality of different security policies associated with the invoked function, based on the location of the mobile device.

14. The method of claim 13 further comprising changing some of the plurality of functions available to be performed by the mobile device, based on the location of the mobile device.

15. The method of claim 12 wherein the invoked function is accessing data.

16. The method of claim 12 wherein the invoked function is making a phone call.

17. The method of claim 12 wherein the requiring the user to satisfy the security requirement corresponding to the first security policy comprises requiring the user to enter a user name.

18. The method of claim 12 wherein the requiring the user to satisfy the security requirement corresponding to the first security policy comprises requiring the user to enter a PIN.

19. The method of claim 18 wherein the PIN is a biometric PIN.

20. The method of claim 12 wherein the requiring the user to satisfy the security requirement corresponding to the first security policy comprises requiring the user to be authenticated using a digital signature.

21. A mobile device configured to perform a plurality of functions comprising:
- a memory for storing a three-dimensional matrix of security policies, wherein the three-dimensional matrix includes a plurality of security requirements as a first dimension, a plurality of functions as a second dimension, and a plurality of locations for the mobile device as a third dimension, wherein each security requirement requires either authentication or encryption of data associated with the associated function to execute the associated function;
- an input device for invoking a function from the plurality of functions by a user;
- a processor for implementing a security requirement from the stored three-dimensional matrix based on the invoked function and the location of the mobile device; and
- a security module for requiring the user to satisfy the implemented security requirement, before the invoked function is performed by the mobile device.

22. The mobile device of claim 21 further comprising means for determining a location of the mobile device.

23. The mobile device of claim 22 wherein the means for determining a location of the mobile device is selected from the group consisting of a GPS, a RF-based location finder, and a transponder.

24. The mobile device of claim 21 wherein the security module requires the user to enter a user name to satisfy the implemented security requirement.

25. The mobile device of claim 21 wherein the security module requires the user to enter a PIN to satisfy the implemented security requirement.

26. The mobile device of claim 25 wherein the PIN is a biometric PIN.

27. The mobile device of claim 21 wherein the security module requires the user to be authenticated using a digital signature to satisfy the implemented security requirement.

28. A method for data security of a mobile device configured to perform a plurality of functions, the method comprising:
- storing, on the mobile device, a three-dimensional matrix of security policies, wherein the three-dimensional matrix includes a plurality of security requirements as a first dimension, a plurality of functions as a second dimension, and a plurality of locations for the mobile device as a third dimension, wherein each security requirement requires either authentication or encryption of data associated with the associated function to execute the associated function;
- invoking, on the mobile device, a function from the plurality of functions by a user;
- implementing, on the mobile device, a security requirement from the stored three-dimensional matrix based on the invoked function and the location of the mobile device; and
- requiring, on the mobile device, the user to satisfy the implemented security requirement, before the invoked function is performed by the mobile device.

29. The method of claim 28 wherein the requiring the user to satisfy the implemented security requirement comprises requiring the user to enter a PIN.

30. The method of claim 29 wherein the PIN is a biometric PIN.

31. The method of claim 28 wherein the requiring the user to satisfy the implemented security requirement comprises requiring the user to be authenticated using a digital signature.

32. A mobile device configured to perform a plurality of functions comprising:
- means for storing a plurality of different security policies, wherein each of the plurality of different security policies has a corresponding security requirement, wherein each of the plurality of functions has an associated security policy, wherein each security requirement requires either authentication or encryption of data associated with the function of the corresponding security policy;
- means for invoking a function from the plurality of functions by a user;
- means for implementing a first security policy from the stored plurality of security policies associated with the invoked function; and
- means for requiring the user to satisfy a security requirement corresponding to the implemented first security policy, before the invoked function is performed by the mobile device.

33. A mobile device configured to perform a plurality of functions comprising:
- means for storing a three-dimensional matrix of security policies, wherein the three-dimensional matrix includes a plurality of security requirements as a first dimension, a plurality of functions as a second dimension, and a plurality of locations for the mobile device as a third dimension, wherein each security requirement requires either authentication or encryption of data associated with the associated function to execute the associated function;
- means for invoking a function from the plurality of functions by a user;
- means for implementing a security requirement from the stored three-dimensional matrix based on the invoked function and the location of the mobile device; and
- means for requiring the user to satisfy the implemented security requirement, before the invoked function is performed by the mobile device.

34. A mobile device configured to perform a plurality of functions comprising:
- a memory for storing a plurality of different security policies, wherein the plurality of different security policies associate each of the plurality of functions to a security requirement, each security requirement requiring either authentication or encryption;
- an input device for invoking a function from the plurality of functions by a user; and a security module for authorizing the user to invoke the function only after satisfying a security requirement associated with the function by either authenticating the user or encrypting data associated with the function.

35. The mobile device of claim 1, wherein the plurality of functions comprises:
accessing data stored locally in the mobile device;
accessing data stored remotely from the mobile device; and
making a phone call.

36. The mobile device of claim 35, wherein the plurality of different security policies associate at least one of the plurality of functions to each of the following security requirements:
requiring the user to enter a user name for authentication;
requiring the user to enter a biometric PIN for authentication;
requiring the user to be authenticated using a digital signature; and
encrypting data associated with the function.

* * * * *